Oct. 2, 1928.
K. A. SIMMON
1,686,040
CONTROL SYSTEM
Filed Aug. 7, 1926
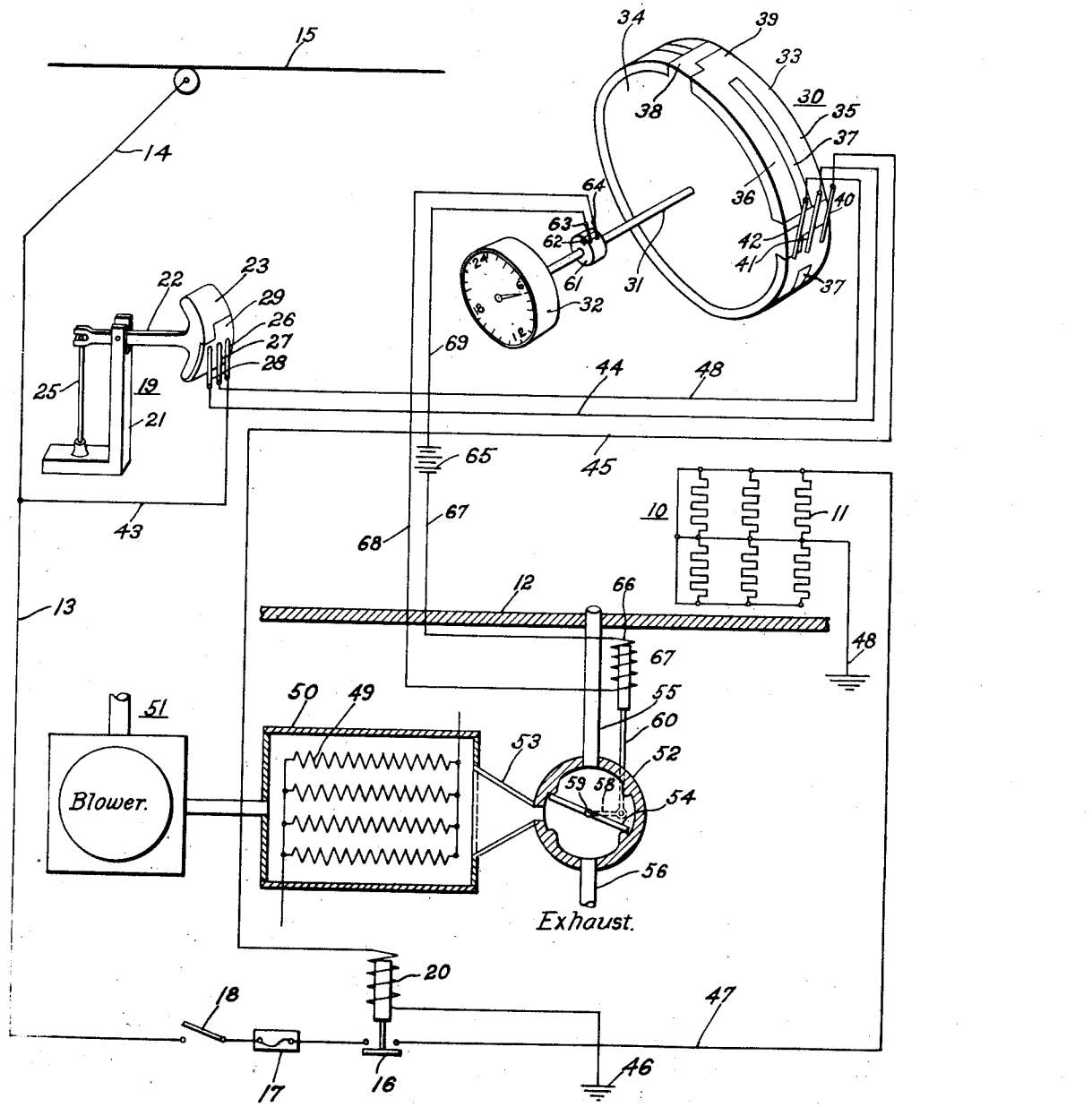
WITNESSES:
INVENTOR
Karl A. Simmon.
BY
ATTORNEY Patented Oct. 2, 1928.

1,686,040

UNITED STATES PATENT OFFICE.

KARL A. SIMMON, OF EDGEWOOD, PENNSYLVANIA, ASSIGNOR TO WESTINGHOUSE ELECTRIC & MANUFACTURING COMPANY, A CORPORATION OF PENNSYLVANIA.

CONTROL SYSTEM.

Application filed August 7, 1926. Serial No. 127,870.

This invention relates to heating-control systems that are primarily intended for use in railway cars.

The object of the invention, generally stated, is the provision of a car-heating system that shall be simple and efficient in operation and that may be readily and economically installed.

A more specific object of the invention is to provide for a variation, at predetermined periods, of the temperature at which a thermostat, utilized for controlling a car heating system, will function.

Another object of the invention is to provide for the control of a heating system during predetermined periods, independently of the thermostat that is normally utilized for restricting changes in temperature.

A further object of the invention is to provide for automatically re-setting a thermostat in order to raise the temperature in a car before cutting off the supply of energy from the heaters during predetermined periods.

It is also an object of the invention to provide for periodically raising the temperature of a car and then cutting off the supply of energy from the heaters for a predetermined interval.

Other objects of the invention will, in part, be obvious, and will, in part, appear hereinafter.

The invention, accordingly, is disclosed in the embodiment thereof shown in the accompanying drawing and comprises the structural features, the combination of elements and the arrangement of parts which will be exemplified in the construction hereinafter set forth and the scope of the application of which will be indicated in the claims.

For a fuller understanding of the matter and objects of the invention, reference should be had to the following detailed description taken in connection with the accompanying drawings, in which:

The single figure is a diagrammatic view of a heating system constructed in accordance with the invention.

Referring now to the drawing, the reference character 10 designates, generally, a car heater which may comprise any desired number of suitable resistors 11. Any suitable number of heaters may be connected in the heater circuit and, as shown, they are directly connected, through a conductor 13 and trolley 14, to a trolley conductor 15. Further, the heaters may be positioned to suit the particular design of the car to be heated; but, in this showing, they are merely located above a member (designated by reference character 12), which is intended to illustrate the car floor.

In order to control the supply of energy to the heaters, an electro-magnetic switch 16, or the like, is connected in the conductors 13 that leads from the source of supply. The heaters are protected from excessive currents by a fuse 17 which is also connected in the conductor 13. Further, a manually operable switch 18 is provided for breaking the connection between the heater 10 and the trolley 14.

A thermostat, illustrated generally at 19, is provided for controlling the energization of the actuating coil 20 of the switch 16, whereby the heater 10 may be cut in and cut out of the supply circuit at predetermined temperatures. As shown, the thermostat 19 comprises a frame 21 in which an arm 22 is pivotally mounted. A head 23, which simulates a segment of a drum, is provided on the arm 22. A contact segment 29 is embedded in the outer face of head 23. In order to isolate the contact segment from the frame, in this particular construction, both the arm and the head are made from some suitable insulating material such, for example, as micarta.

As illustrated, the contact segment 29 is disposed to engage three contact fingers 26 to 28, inclusive. The actuation of the head to move the contact segment 29 into and out of engagement with the contact fingers 26 to 28, inclusive, may be effected by any suitable thermo-responsive element which, in this case, is a rod 25 that is interposed between the frame 21 and one end of the pivotally mounted arm 22. The rod 25 may be made from some suitable thermo-responsive material, such as copper.

In operating electrical cars and subway trains in large cities, it is found that there are certain periods during the day such, for example, as the hours of 7:30 a. m. to 9:00 a. m., when the inhabitants are going to work, or between 5:00 and 6:00 p. m., when they are going home from places of business, during which periods the transportation systems have all their available vehicles in use, thereby imposing on the power house their heaviest loads, which are called their peak loads.

During such periods, it is desirable to reduce the demand for power in every possible way, consistent with rendering first-class service.

In this particular car-heating system, provision is made for taking advantage of the crowded condition of the vehicles, which is one of the features of rush hours mentioned above, by making use of the natural animal heat that is generated in a crowded car and in the cooling system provided for the motors, to maintain the vehicles at the desired temperature and permit the cutting out of the car heaters. In such cases, if the temperature of the car or vehicle is raised to a point slightly in excess of the normal temperature before it is crowded with passengers, the heat given up by the passengers will be sufficient to prevent the temperature from dropping below that which is normally maintained for their comfort.

In order to provide for the changing of the temperature at which the thermostat 19 will cut out the car heaters 10 from the supply circuit, a drum 30 is provided to cooperate in controlling the heater supply circuits. As shown, the drum 30 is mounted on a shaft 31, which is actuated by any suitable clock mechanism 32. In this manner, provision is made for giving the drum a complete rotation every twenty-four hours.

The drum 30 may be composed of any suitable insulating material, such as micarta. Embedded in the drum are a plurality of contact segments 33 and 34. As shown, each segment is provided with two arms 35 and 36 which are separated by a ridge 37 on the drum 30. Separating the ends of the contact segments 33 and 34 are raised portions 38 which extend transversely of the drum. Each contact segment is provided with a projection 39, the function of which will be pointed out hereinafter.

A plurality of contact fingers 40 to 42, inclusive, which are connected in the control circuit that is provided for regulating the supply of electrical energy to the heaters, are disposed to ride on the drum 30. As will be observed, the contact fingers 40 and 42 are positioned in alinement with the arms 35 and 36, respectively, of the contact segments 33 and 34, while the contact finger 41 is located in alinement with the insulating ridges 37 on the drum 30.

Assuming that it is approximately 6:00 a. m., that a car is operating with the heater connected to the source of supply of electrical energy and that the temperature within the vehicle is in the neighborhood of 48° F., current flows from the trolley line 15 through the trolley 14, conductors 13 and 43, contact finger 28, contact segment 29, contact finger 26, conductor 44, contact finger 42, contact segment 34, contact finger 40, conductor 45 and the actuating coil of the switch 16, to a ground at 46. Accordingly, the line switch 16 is closed, and current flows from the trolley 14 through conductor 13, switches 18 and 16, conductor 47, and through the heater 10 to a ground at 48. As long as the switch 16 is retained closed, the heater 10 thus tends to raise the temperature in the car.

As the temperature in the car is raised above a predetermined value, which, in this particular instance, is 50°, the thermostat 19 functions to break the above-traced line-switch-actuating circuit. Accordingly, the switch 16 is dropped out and the supply of energy is cut off from the heater 10.

Assuming now that the hour of 7:00 a. m., for example, has arrived, and it is desired to change the temperature at which the thermostat will function to raise the temperature in the car 10° above normal in order that the heater 10 may be disconnected from the supply circuit, during the rush period, which, in this particular case, has been set as from 7:30 a. m. to 9:00 a. m. As will be apparent from the drawing, when the clock reaches the hour of 7:00 a. m., the drum 30 is rotated to the point where it drops the finger 41 off the insulating ridge 37. If the temperature in the car has been raised above 50°, and the finger 28 has dropped off the contact segment 29 that is carried by the head 23, a line-switch-actuating circuit is closed through the contact fingers 26 and 27.

The circuit now established extends from trolley line 15 through trolley 14, conductor 13, conductor 43, contact finger 26, contact segment 29, contact finger 27, conductor 48, contact finger 42, contact segment 34, contact finger 40, conductor 45, and actuating coil 20 of the switch 16 to the ground at 46. Thus, the line switch 16 will be maintained closed until the temperature in the car reaches 60° F., when the thermostat will function to drop the fingers 26 and 27 off the contact segment 29, thereby breaking the line-switch-actuating circuit and cutting off the supply of energy from the heater 10.

When the hour of 7:30 arrives, the drum 30 is advanced to the point where the fingers 40 and 41 are dropped off the contact segment 34, and the line-switch-actuating circuit is broken independently of the thermostat 19. In this manner, the heater may be disconnected from the supply circuit at predetermined hours and may be maintained inactive for any desired period.

Assuming now that the hour of 9:00 a. m. has arrived, the drum operated by the clock mechanism 32 will have advanced until the contact finger 41 is picked up by the second ridge of insulation, designated by the numeral 37, while the contact fingers 40 and 42 engage the contact segment 34. The circuits originally described may now be reestablished through the action of the thermostat in response to the changes in temperature.

In order to aid in maintaining a desired temperature in the car during peak hours, when the heaters are disconnected from the supply circuit, provision is made for utilizing the heat given up by the motor grids, which are illustrated at 49. In this particular construction, the grids 49 are enclosed by a casing 50. In order to direct a current of air over the grids 49 for cooling purposes, a blower, shown generally at 51, is connected to one end of the casing 50. The casing 50 opens into a valve casing 52 through a funnel-shaped passage 53.

The direction of flow of the air entering the valve casing 52 from the grid casing 50, may be controlled by means of a butterfly valve 54. As shown in the drawing, two passages lead from the casing 52, the upper one 55 extending into the car, while the lower one 56 provides for the discharge of the air to the atmosphere at some convenient place.

In this embodiment of the invention, an electro-magnet 57 is provided for actuating the butterfly valve. In order to establish a connection between the electro-magnet 57 and the butterfly valve 54, one of the trunnions 59 provided for mounting the latter in the casing 52, is extended and has fixed thereto a lever 58. A connecting rod 60, depending from the electromagnet, is pivotally mounted to the outer end of the lever arm 58.

Since it is desired to direct the current of air flowing over the grids 49 into the car when the heaters 10 are cut out, an auxiliary drum 61, which is provided with a plurality of contact segments 62, is keyed to the shaft 31. As shown in the drawing, one of the contact segments 62 is disposed to engage the contact fingers 63 and 64 at 7:30 a. m.

A storage battery 65 is provided in this particular arrangement for the purpose of energizing the actuating coil 66 of the electromagnet 57. Accordingly, when the contact fingers 63 and 64 are engaged by one of the contact segments 62, current flows from the battery 65 through conductor 67, actuating coil 66, conductor 68, contact fingers 63 and 64, which are bridged by the contact segment 62, and conductor 69 back to the battery.

Therefore, when a car is in operation, and the clock mechanism rotates the drums 30 and 61 forward to the positions assumed at 7:30 a. m., the heaters 10 will be disconnected from the supply circuit and the electromagnet 57 will be energized. Upon the energization of the electromagnet 57, the butterfly valve 54, is rotated counter-clockwise, and the current of air passing over the grids, 59 is directed through the casing 52 and passage 55 into the car.

As the drum 61 rotates forward with the clock mechanism, the contact fingers 53 and 54 are dropped off the contact segments 62. This effects the deenergization of the electro-magnet 57, and the weight of the lever arm 58 and connecting rod 60 are sufficient to rotate the butterfly valve clockwise to cause the discharge of the air passing over the grids to the atmosphere.

It will be readily understood that by changing the shape of the contact segments 33 and 34 on the drum 30 and the setting of the drum relative to the clock mechanism, that the temperature at which the thermostat will function to disconnect the heaters from the supply circuit may be changed to function automatically at any predetermined time and that the heaters may be disconnected for any desired interval of time.

Since certain changes may be made in the above construction, and different embodiments of the invention may be made without departing from the scope thereof, it is intended that all matter contained in the above description or shown in the accompanying drawing shall be interpreted as illustrative and not in a limiting sense.

I claim as my invention:

1. In a car-heating system, in combination, a heater, a circuit for supplying energy to the heater, means for breaking the circuit and maintaining it open during predetermined periods, and a thermostat operable on changes in temperature for controlling the circuit.

2. In a car-heating system, in combination, a heater, a circuit for supplying energy to the heater, a thermostat for making and breaking the circuit upon changes in temperature, and means for breaking the circuit and maintaining it open during predetermined periods, said means being independent of the thermostat.

3. In a car-heating system, in combination, a heater, a circuit for supplying energy to the heater, a thermostat for making and breaking the circuit upon changes in temperature and means for causing the thermostat to function at different temperature values.

4. In a car-heating system, in combination, a heater, a circuit for supplying energy to the heater, a switch connected in the heating circuit for controlling the supply of energy to the heater, a switch actuating circuit, a thermostat operable upon changes in temperature to control the switch-actuating circuit to operate the switch, and means for operating the switch independently of the thermostat.

5. In a car-heating system, in combination, a heater, a circuit for supplying energy to the heater, means for controlling the supply of energy through the circuit to the heater, a thermostat for actuating the control means upon changes in temperature, and means automatically operable to cause the thermostat to function at a predetermined temperature other than its normal setting.

6. In a car-heating system, in combination, a heater, a circuit for supplying energy to the heater, means for controlling the supply of energy through the circuit to the heater, a thermostat for actuating the control means upon changes in temperature, means automatically operable to cause the thermostat to function at a predetermined temperature other than its normal setting, and means for breaking the circuit and maintaining it open during predetermined periods independently of the thermostat.

7. In a car-heating system, in combination, a heater, a circuit for supplying energy to the heater, means for controlling the supply of energy through the circuit to the heater, a thermostat for actuating the control means upon changes in temperature, a drum for governing the circuit independently of the thermostat, and a clock mechanism for rotating the drum to maintain the heater circuit open during predetermined intervals.

8. In a car-heating system, a heating device, means for governing said device to normally maintain a substantially constant temperature, and means operative at a predetermined time for increasing said temperature for a predetermnied period of time and for subsequently disconnecting said heating device.

9. In a control system, a heating device, a thermostat for governing the operation of said device, and means comprising a time clock for automatically changing the setting of said thermostat at predetermined times and for cutting off and on the power flow to said device.

10. In a car-heating system, in combination, a heater, a circuit for supplying energy to the heater, means for controlling the supply of energy to the heater, a thermostat sensitive to changes in temperature for actuating the control means, means for effecting a variation in the temperature value at which the thermostat will function, and clock-actuated means for cutting off the supply of energy from the heater for predetermined intervals independently of the thermostat.

11. In a car-heating system, in combination, a heater, a thermostat for controlling the heater, motor grids, means for forcing air over the motor grids, means for controlling the delivery of the air, and means independent of the thermostat for cutting out the heater and actuating the air control means to utilize the air passing over the motor grids for heating the car when the heater is not in operation.

12. In a car-heating system, in combination, a heater, a thermostat for controlling the heater, motor grids, means for forcing a fluid over the grids to carry off the heat, means for automatically resetting the thermostat at predetermined periods, means independent of the thermostat for cutting out the heater for certain periods and means for utilizing the fluid for heating purposes when the heater is cut out.

13. In a car-heating system, in combination, a heater, motor grids, means for forcing a fluid over the grids to absorb and carry off heat, and means for cutting out the heater for predetermined periods and for utilizing the fluid for heating the car during said predetermined periods.

14. In a car-heating system, in combination, a heater, a thermostat for controlling the heater, means for automatically changing the setting of the thermostat at predetermined periods, means independent of the thermostat for cutting out the heater, motor grids, means for forcing a fluid over the grids to carry off the heat, and means for utilizing the heated fluid for heating purposes when the heater is cut out.

In testimony whereof, I have hereunto subscribed my name, this 5th day of August, 1926.

KARL A. SIMMON.